United States Patent [19]

Ream et al.

[11] Patent Number: 4,751,716
[45] Date of Patent: Jun. 14, 1988

[54] HOLLOW CYLINDRICAL SOLID STATE LASER MEDIUM AND A LASER SYSTEM USING THE MEDIUM

[75] Inventors: Stanley Ream, Newport Beach; Chun-Sheu Lee, Torrence; Kenneth A. Fukae, Irvine, all of Calif.

[73] Assignee: Amada Engineering & Service Co., Inc., La Mirada, Calif.

[21] Appl. No.: 858,010

[22] Filed: May 1, 1986

[51] Int. Cl.⁴ .................. H01S 3/045; H01S 3/093
[52] U.S. Cl. ...................... 372/72; 372/35; 372/41; 372/66
[58] Field of Search .......... 372/66, 41, 99, 35, 372/72, 70

[56] References Cited

U.S. PATENT DOCUMENTS

| | | | |
|---|---|---|---|
| 3,383,621 | 5/1968 | Luck et al. | 372/66 |
| 3,493,888 | 3/1970 | Jackson | 372/35 |
| 3,725,811 | 4/1973 | Murphy | 372/41 |
| 3,891,945 | 6/1975 | Schlossberg et al. | 372/66 |
| 4,417,341 | 11/1983 | Yamanaka et al. | 372/70 |

FOREIGN PATENT DOCUMENTS

2542652  7/1977  Fed. Rep. of Germany ........ 372/66

OTHER PUBLICATIONS

Johnson; Coherent Oscillations from $Tm^{3+}$, $Ho^{3+}$, $Yb^{3+}$ and $Er^{3+}$ Ions in Yttrium Aluminum Garnet; 09/1965; pp. 127–129.

*Primary Examiner*—James W. Davie
*Assistant Examiner*—Xuan T. Vo
*Attorney, Agent, or Firm*—Wigman & Cohen

[57] ABSTRACT

A solid state laser medium for use in a solid state laser oscillator uses a hollow cylindrical solid state laser medium which is formed cylindrically in order to improve the cooling efficiency of the laser. The laser includes a pumping device for exciting the laser medium and an optical resonator that is arranged on both ends in the axial direction of the laser medium. The pumping device includes a plurality of flash lamps that are arranged on the outside, with respect to the central longitudinal access of the laser medium, of the outer surface of the hollow cylindrical laser medium and an outer reflector that is arranged so as to enclose the flash lamps and the laser medium, from the outside, with respect to the central longitudinal access of the laser medium, of the flash lamps, and a cylindrical inner reflector with outer diameter which is slightly smaller than the inner diameter of the laser medium, the inner reflector being inserted in the cavity of the laser medium. Cooling apparatus for cooling the hollow cylindrical solid state laser medium from both the outer longitudinal surface and the inner longitudinal surface of the hollow cylinder are also provided.

25 Claims, 5 Drawing Sheets

HOLLOW CYLINDRICAL SOLID STATE LASER MEDIUM AND A LASER SYSTEM USING THE MEDIUM

BACKGROUND OF THE INVENTION

1. Field of the Invention

The present invention relates to high-power flash lamp pumped, solid state lasers, such as those used for materials processing (e.g. drilling, cutting, welding, heat treating cladding, machining). Specifically, this invention relates to a new configuration of solid state gain medium, laser resonator, and flash lamp array which can provide significantly higher output laser power and beam quality than that possible from traditional solid state laser designs. The present invention describes a solid state laser which is principally defined by a hollow cylindrical solid state gain medium (glass or crystal), in contrast to conventional solid cylinder gain mediums or slab gain mediums.

2. Description of Related Art

In the past, as the solid state laser medium there have been known such media as the rod-like solid state laser medium and the slab-like solid state laser medium.

The rod-like solid state laser medium emits a laser beam when irradiated by a flash lamp surrounding the medium.

However, in such a device, when the diameter of the rod becomes large enough, heat that is generated during irradiation is accumulated in the interior of the rod, with the consequent drawbacks that not only the index of refraction becomes nonuniform within the medium but also that the rod itself suffers from mechanical stresses. In addition, when the diameter of the rod becomes too large, it leads to a problem that the excitation fails to reach the central portion of the rod with sufficient strength.

On the other hand, in the slab-like laser medium, both of the top and bottom surfaces of the slab are excited, for example, with the flash lamps as in the above, and at the same time, the laser beam that is excited is input and output via end surfaces of the slab that are cut with Brewster angle. In the laser medium, the excited laser beam is reflected between the top and bottom surfaces and propagates the whole length of the laser medium, so that the laser beam is free from lens effects and the efficiency of energy take-out is high.

However, in such a case the laser beam propagates through the medium by undergoing total reflection between the top and the bottom surfaces of the medium. Therefore, in order to maintain a satisfactory condition of oscillation, both surfaces have to be polished accurately, which leads to a problem that the fabrication requires a great amount of labor.

SUMMARY OF THE INVENTION

An object of the present invention is to overcome the above problems by providing a hollow cylindrical laser medium, and a laser device that makes use of the laser medium, which is capable of readily removing waste thermal energy generated in the pumping.

Another object of the present invention is to provide a hollow cylindrical laser medium, and a laser device that makes use of the laser medium, that can minimize the thermally induced mechanical stresses.

Another object of the present invention is to provide a hollow cylindrical laser medium, and a laser device that makes use of the laser medium, that is capable of uniformly pumping the laser medium.

Another object of the present invention is to provide a hollow cylindrical laser medium, and a laser device that makes use of the laser medium, that is capable of inputting a large pumping power.

Another object of the present invention is to provide a hollow cylindrical laser medium, and a laser device that makes use of the laser medium, that is capable of outputting a laser beam of high output power.

Another object of the present invention is to provide a hollow cylindrical laser medium, and a laser device that makes use of the laser medium, that output a laser beam which has an extremely satisfactory beam cross section.

Another object of the present invention is to provide a hollow cylindrical laser medium, and a laser device that makes use of the laser medium, that can be fabricated with great ease.

Another object of the present invention is to provide a hollow cylindrical laser medium, and a laser device that makes use of the laser medium, that is mechanically more rigid.

Another object of the present invention is to provide a hollow cylindrical laser medium, and a laser device that makes use of the laser medium, that can be cast easily from such material as glass.

Another object of the present invention is to provide a hollow cylindrical laser medium, and a laser device that makes use of the laser medium, that permits easy hermetical sealing of the coolant for cooling the laser medium.

Another object of the present invention is to provide a laser device that can cool the hollow cylindrical laser medium from both sides of outer and inner surfaces of the laser medium.

In order to attain these objects, the solid state laser medium according to the present invention is formed cylindrically, and the laser device according to the present invention comprises a hollow cylindrical solid state laser medium;

pumping means for exciting the laser medium; and an optical resonator that is arranged on both ends in the axial direction of the laser medium, for causing the light emitted into said laser medium to travel back and forth along the axial direction of the laser medium.

These and other objects, features and advantages of the present invention will be more apparent from the following description of a preferred embodiment, taken in conjunction with the accompanying drawings.

DESCRIPTION OF THE PREFERRED EMBODIMENT

Conventional solid state lasers, which produce laser powers suitable for materials processing applications, are comprised of two types, solid rod (FIG. 1) and, more recently, slab geometries (FIG. 2) for the laser gain medium. The advantages and disadvantages of these two laser gain configurations will be discussed here individually.

Figure 1:
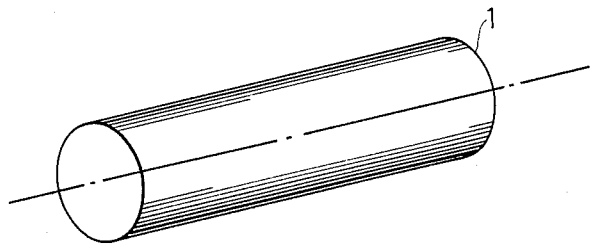
FIGS. 1 and 2 schematically illustrate a conventional solid state laser medium of a solid rod geometry and a slab geometry.

Solid rod laser geometries 1, such as that shown in FIG. 1, are the easiest to fabricate. The rod can be grown as a single crystal, or it can be cast as a glass, depending on the selection of host material. The rod geometry offers simplicity of mounting and sealing within the laser resonator. Only the ends of the rod are of critical optical importance, so it is not necessary to provide a highly polished optical surface on the outside diameter of the rod. Coupling of flash lamp light energy into the rod geometry can be accomplished with reasonable uniformity through the use of reflective cavities and multiple flash lamps (Not shown).

On the other hand, the rod geometry has clear limitations which are a function of its geometry as well as the physical properties of the solid state lasing medium. In order to achieve higher laser output powers, the flash lamp pumping energy and the volume of gain medium must be increased. However, the increase in outside surface area of the solid rod is proportional to the rod diameter, while the volume is proportional to the square of the rod diameter. Since it is necessary to remove unused thermal energy from the laser medium, it can be seen that increases in rod diameter for the purpose of higher average power output are quickly counteracted by an inability to remove waste heat. This waste heat accumulates in the central core of the solid rod and causes several detrimental effects. First, the higher core temperature causes thermal stresses which induce a convex shape in the faces of the ends of the rod.

This change in optical figure distorts the laser resonator shape and causes changes in laser power and/or laser beam quality. Secondly, the thermal gradient from the center of the rod to the outside surface causes a change in the refractive index of the rod, and this also results in distortion of the laser beam within the resonator. Finally, the thermal gradient and resultant mechanical thermal stresses can be sufficiently great to produce fracture of the gain medium.

Figure 2:
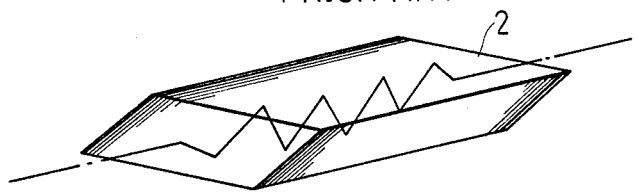

In order to avoid many of the above drawbacks, solid state lasers of a slab geometry 2, which is shown in FIG. 2, have been proposed and investigated. There are three primary advantages to this geometry. First, the ratio of volume of laser medium to surface area is more linear than in the case of a solid rod. Because of this, cooling capacity increases uniformly with increases in a slab width. Secondly, pumping light/illumination of lasing material in the slab medium can be made more uniform, since two sided pumping is available. Thirdly, the zig-zag path of light through the slab serves to compensate for any thermally induced changes in refractive index through the slab thickness.

The disadvantage of the slab are primarily related to the difficulties involved in the fabrication of the slab itself and in the mounting of the slab. Because the faces of the slab are part of the laser resonator, these surfaces must be flat and parallel to within a fraction of the wavelength of laser light.

This flatness consideration holds true for the end of the slab as well. Additionally, the overall slab length should be a correct multiple of the slab thickness, and the corners should not be rounded in the manufacturing process. These interdependent requirements place extreme difficulty on the slab manufacturing process, and they are further compounded by thermal effects during operation and by the mechanical effects associated with mounting.

Figure 3:
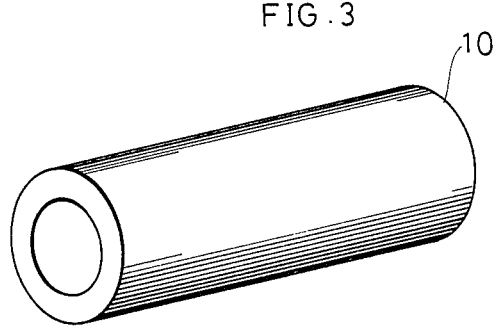
FIG. 3 schematically illustrate a solid state laser medium of a hollow circular cylindrical geometry emboding the present invention.

Now, the present invention, which overcomes the above drawbacks, is explained. In FIG. 3 the solid state laser medium of a hollow circular cylindrical geometry 10 is shown. The hollow circular cylindrical laser medium preferably has a shape in which the ratio of the inner diameter to the outer diameter of the hollow circular cylinder is greater than one half. In addition to the shape shown, the cylinder may take other forms, such as that of a hollow octagonal cylinder.

This laser medium has a practically maximized ratio of cooling surface area to laser medium volume, and moreover, does not exceptionally tax solid state medium fabrication technology.

The hollow cylinder gain medium 10 may be grown as a crystal, such as a YAG crystal cast as a glass, or drilled from a solid cylinder. The element that is contained within the laser medium and causes inversion in distributions may be $Nd^{3+}$, $Cr^{3+}$, $U^{3+}$, $Ce^{3+}$, $Pr^{3+}$, $Ho^{3+}$, $Er^{3+}$, or $Tb^{3+}$. Only the ends of the hollow cylinder 10 are required to be optically flat and polished. The outside surface of the hollow cylinder 10 is mechanically ground, sand blasted, or chemically etched to act as a diffuser to the flash lamp light, to improve heat transfer to the water coolant, and to minimize parasitic lasing modes within the gain region. The inside surface of the hollow cylinder 10 may be smooth or diffuse.

Figure 4:
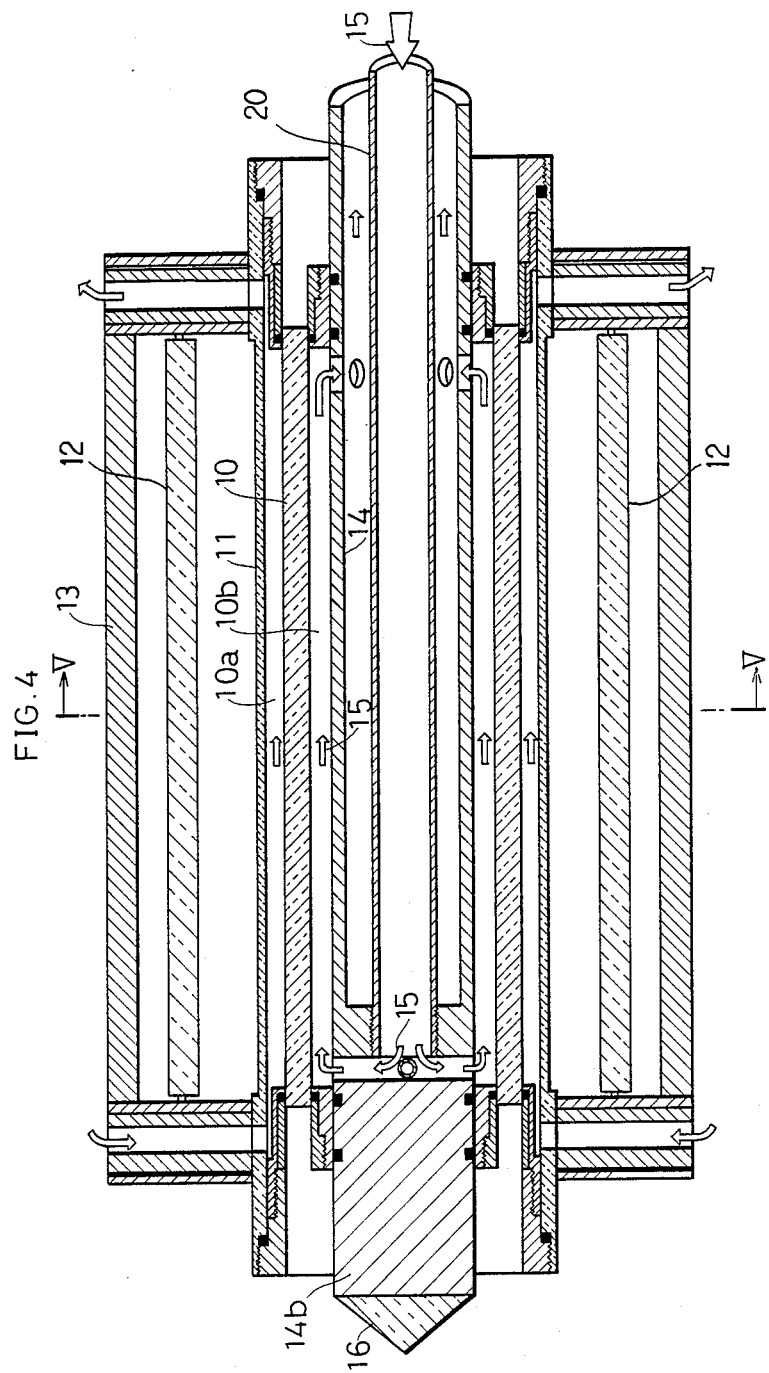
FIGS. 4 and 5 are a longitudinal cross-sectional view and a cross-sectional view which show the laser system making use of said hollow circular cylindrical solid state laser medium.
Figure 5:
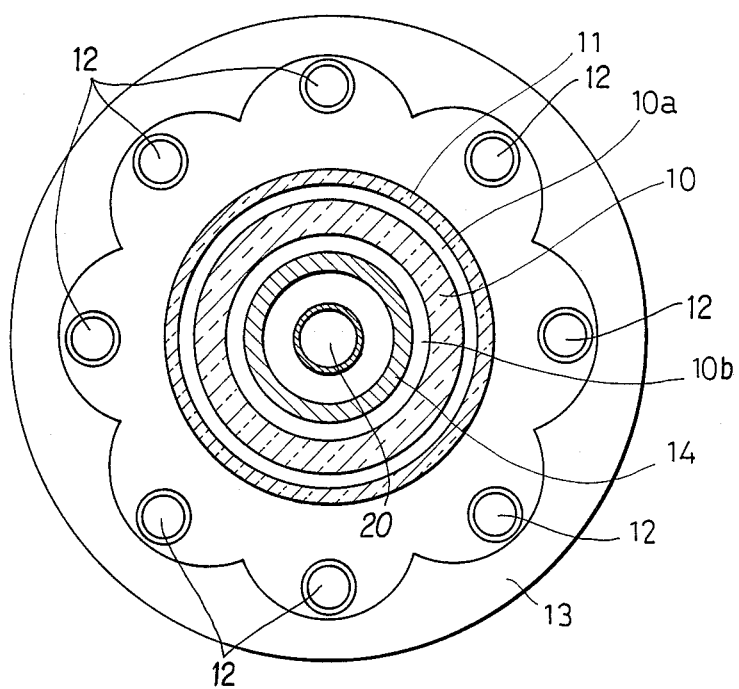

Next, the laser system, which is equipped with the hollow cylindrical solid state laser medium 10 depicted in FIG. 3, is shown in FIGS. 4 and 5.

The gain circular cylindrical medium 10 is surrounded by a shielding member 11 with some spacing between the member 11 and the medium 10 to form a outer coolant channel 10a. The shielding member 11 is prefered made of Pyrex tubing.

Surrounding the shielding member 11 are eight equally spaced flash lamps 12 of conventional design.

This multiplicity of flash lamps 12 provides (1) higher light pumping power, (2) improved uniformity of light illumination, and (3) permits the flash lamps to be operated in a more favorable range of their rated power. This last point deserves some clarification. When flash lamps of traditional design are operated near their rated power, the light emission of the flash lamp shifts toward the shorter wavelengths, which are away from the wavelengths which serve to pump the lasing medium and its surrounding components, thereby detracting from their performance. Further, when the flash lamps are operated at their rated power, the useful lifetime is less than that which can be achieved at lower powers. An additional benefit of the geometry of the laser medium is that, if necessary, conventional elliptical reflectors can be used with a few as one flash lamp in the pump cavity. There are, therefore, no restrictions on the number of flash lamps to be used in pump cavity design. Thus, the ability of the present invention to utilized a multiplicity of flash lamps provides many benefits. The flash lamp 12 are further surrounded by a outer reflector 13.

Within the hollow cylindrical gain medium 10 is positioned a inner cylindrical reflector 14. This reflector 14 serves to return flash lamp light which are transmitted through the wall of the gain medium 10 back into the gain medium 10 for additional pumping of the medium. This reflector also (1) is fitted to an inner tube 20 which provides a portion of an inner coolant channel 10b for water coolant flow 15 to the interior surface of the hollow gain medium 10 and (2) supports the cone of the axicon mirror assembly 16 which will be explained in the next paragraph.

Figure 6:
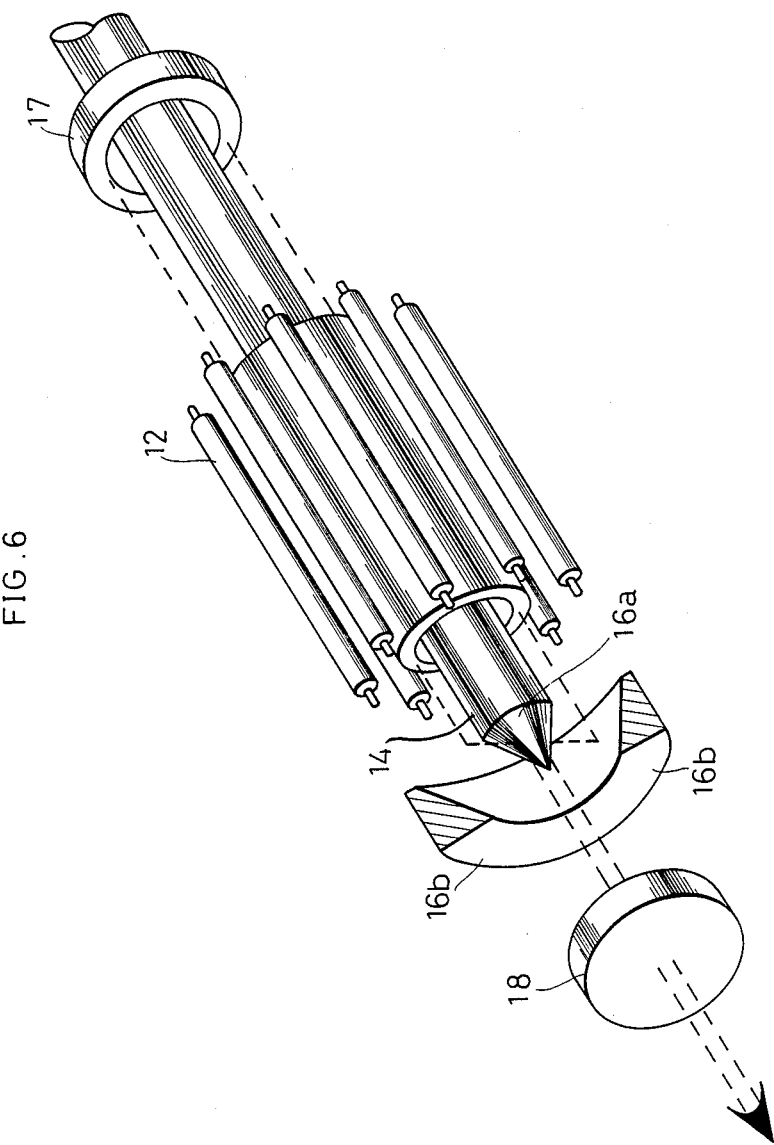
FIG. 6 is a perspective view of an optical system of the laser system shown in FIGS. 4 and 5.
Figure 7:
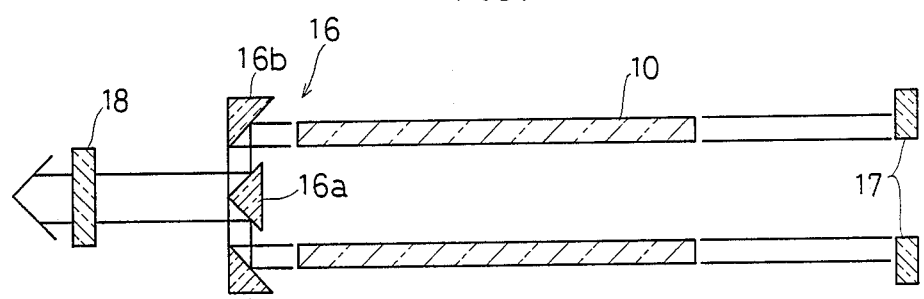
FIG. 7 is a schematic sectional view of the optical system of the laser system which is indicated in FIGS. 4 and 5.

Shown in FIGS. 6 and 7 are the optical resonator which is mounted on the laser system indicated in FIGS. 4 and 5.

The optical resonator for the present invention is comprised of four components. The 100% reflective rear mirror 17 and the output coupler 18 are flat, as in the case of traditional rod-type solid state lasers. The two other optical elements of the resonator comprise the axicon mirror 16 assembly. This includes a central cone (inner reflector) 16a and a truncated outer cone (outer reflector) 16b. Together they produce a full or nearly full beam cross section from the annular beam cross section in the gain region. The axicon mirror assembly comprises, in the preferred embodiment, an output mirror unit with reflectivity smaller than that of 100% that is arranged on the front end in the axial direction of the cylinder of the hollow circular cylindrical laser medium. Also, the rear mirror comprises an annular mirror formed with its outer diameter and the inner diameter to be greater than the outer diameter and smaller than the inner diameter, respectively, of the hollow circular cylindrical laser beam.

As is evident from the above, benefits of the present invention are as follows:

(1) Waste heat removal, relative to a given volume of solid state lasing medium is practically maximized with this geometry.

(2) The lasing medium is mechanically more rigid than the solid rod or the slab geometries.

(3) Thermally induced stresses, for any given temperature, are lower in this geometry than in rod geometry.

(4) For a given volume of lasing medium, the hollow cylindrical geometry provides more uniform illumination of the light pumping energy within the medium (compared to rod geometry).

(5) The hollow cylindrical gain medium can be fabricated to the required tolerances with much greater ease than the slab geomtry.

(6) The cylindrical geometry is easier to seal against water coolant leaking than the slab geometry.

(7) Because of (1) above, the present invention can make use of lower cost gain medium such as glass, which is castable directly into hollow cylindrical shapes of large volume.

(8) Because (1) and (7), hollow cylinder, glass medium lasers of high average power should be possible.

(9) Because of (1), (2), (3), (4), and (5) the output beam quality of the present invention should be better than that of traditional rod lasers and better than that of conventional slab lasers which are operated at high power.

(10) Due to (1), (3), and (9) the lasing medium (glass or crystalline) can be operated at higher input powers for a given volume of lasing medium than those of conventional rod geometries.

Although the invention has been described in its preferred embodiments, it is to be understood that various changes and modifications may be made within the purview of the appended claims without departing from the true scope and spirit of the invention in its broader aspects.

What is claimed is:

1. A laser device, comprising:
 a hollow cylindrical solid state laser medium;
 pumping means for exciting the laser medium; and
 an optical resonator that is arranged on both ends in the axial direction of said laser medium, for causing the light emitted into said laser medium to travel back and forth along the axial direction of the laser medium, in which said pumping means comprises:
 (a) a plurality of flash lamps that are arranged in the outside, with respect to the central longitudinal axis of the laser medium, of the outer surface of said hollow cylindrical laser medium;
 (b) an outer reflector that is arranged so as to enclose the flash lamps and said laser medium, from outside with respect to the central longitudinal axis of the laser medium, of the flash lamps; and
 (c) a cylindrical inner reflector with outer diameter which is slightly smaller than the inner diameter of said laser medium, said inner reflector being inserted in the cavity of said laser medium.

2. The laser device of claim 1, further comprising cooling means for cooling the hollow cylindrical solid state laser medium from both of the outer longitudinal surface and the inner longitudinal surface of the hollow cylinder, in which said cooling means comprises:
 (a) an outer shielding member made of a transparent material for covering the outer surface of said hollow cylindrical laser medium, said outer shielding member having a predetermined spacing from the outer surface;
 (b) an inner shielding member which serves also as an inner reflector for the emitted light, said inner shielding member having an outer diameter that is slightly smaller than the inner diameter of said laser medium, said inner shielding member being inserted in the cavity of the laser medium; and
 (c) a coolant that is flowed in the channel formed between said medium and the outer shielding member and also in the channel formed between said laser medium and the inner shielding member.

3. The laser device of claim 1, in which said hollow cylindrical solid state laser medium comprises a hollow circular cylindrical solid state laser medium.

4. The laser device of claim 3, in which said optical resonator comprises:
 a rear mirror with substantially 100% reflectivity, said rear mirror being arranged on the rear end of said laser medium in the axial direction of the cylinder of said hollow circular cylindrical solid state laser medium; and
 an output mirror unit with reflectivity less than 100%, said output mirror being arranged on the front end of the laser medium in the axial direction of the cylinder of said hollow circular cylindrical laser medium.

5. The laser device of claim 4, in which said rear mirror comprises an annular mirror formed with its outer diameter and the inner diameter to be greater than the outer diameter and smaller than the inner diameter, respectively, of said hollow circular cylindrical laser beam.

6. The laser device of claim 4, in which said output mirror unit comprises an output mirror that is arranged on the front end of the laser medium in the axial direction of said hollow circular cylindrical laser medium, said output mirror being separated by a predetermined distance away from the front end of said laser medium, and an axicon mirror assembly that is inserted between said laser medium and output mirror so as to let the incident and reflecting surface of the outer reflector face said laser medium, as well as to let the incident and reflecting surface of the inner reflector face said output mirror.

7. The solid state laser medium of claim 5, in which the surface finish of the outer surface of said hollow cylinder is one of a mechanically ground finish, sand blasted finish, and chemically etched finish.

8. The solid state laser medium of claim 5, in which the base material for said laser medium comprises a transparent glass.

9. The solid state laser medium of claim 8, in which the element that is contained in said laser medium and causes inversion in distributions consists of $Nd^{3+}$, $Cr^{3+}$, $U^{3+}$, $Ce^{3+}$, $Pr^{3+}$, $Ho^{3+}$, $Er^{3+}$, and $Tb^{3+}$.

10. The solid state laser medium of claim 5, in which the base material for said laser medium comprises a transparent crystal.

11. The solid state laser medium of claim 10, in which the surface finish of the outer surface of said hollow cylinder is one of a mechanically ground finish, sand blasted finish, and chemically etched finish.

12. The solid state laser medium of claim 10, in which the element that is contained in said laser medium and causes inversion in distributions consists of $Nd^{3+}$, $Cr^{3+}$, $U^{3+}$, $Ce^{3+}$, $Pr^{3+}$, $Ho^{3+}$, $Er^{3+}$, and $Tb^{3+}$.

13. The solid state laser medium of claim 10, in which said crystal comprises a YAG crystal.

14. The solid state laser medium of claim 13, in which the element that is contained in said laser medium and causes inversion in distributions consists of $Nd^{3+}$, $Cr^{3+}$, $U^{3+}$, $Ce^{3+}$, $Pr^{3+}$, $Ho^{3+}$, $Er^{3+}$, and $Tb^{3+}$.

15. A laser device, comprising:
a hollow cylindrical solid state laser medium;
pumping means for exciting the laser medium;
an optical resonator arranged on both ends in the axial direction of the cylinder of the laser medium, for causing the radiation emitted into the laser medium to travel back and forth along the axial direction of the cylinder of the laser medium; and
cooling means for cooling the hollow cylindrical solid state laser medium from both of the outer longitudinal surface and the inner longitudinal surface of the hollow cylinder, in which said cooling means comprises:
(a) an outer shielding member made of a transparent material for covering the outer surface of said hollow cylindrical laser medium, said outer shielding member having a predetermined spacing from the outer surface;
(b) an inner shielding member which serves also as an inner reflector for the emitted light, said inner shielding member having an outer diameter that is slightly smaller than the inner diameter of said laser medium, said inner shielding member being inserted in the cavity of the laser medium; and
(c) a coolant that is flowed in the channel formed between said medium and the outer shielding member and also in the channel formed between said laser medium and the inner shielding member.

16. The laser device of claim 15, in which said coolant comprises water.

17. The laser device of claim 15, in which said outer shielding member comprises a pyrex glass.

18. The laser device of claim 15, in which said pumping means comprises eight flash lamps that are arranged symmetrically on the outside, with respect to the central longitudinal axis of the laser medium, of the outer surface of said laser medium.

19. The laser device of claim 15, in which the base material for said laser medium comprises a transparent glass.

20. The laser device of claim 15, in which the base material for said laser medium comprises a transparent crystal.

21. The laser device of claim 15, in which the surface finish of the outer surface of said hollow cylinder is one of a mechanically ground finish, sand blasted finish, and chemically etched finish.

22. A laser device, comprising:
(a) a hollow circular cylindrical solid state laser medium;
(b) pumping means for exciting the laser medium; and
(c) an optical resonator having a rear mirror and output mirror unit that are arranged on both ends in the axial direction of said laser medium, for causing the light emitted into said laser medium to travel back and forth along the axial direction of the laser medium;
said output mirror unit having
(i) an output mirror that is semi-transparent and arranged on the front end of the laser medium in the axial direction of said hollow circular cylindrical laser medium, said output mirror being separated by a predetermined distance away from the front end of said laser medium, and
(ii) an axicon mirror assembly that is inserted between said laser medium and output mirror for producing a laser beam having substantially full beam cross-section from a laser beam having an annular beam cross-section,
said axicon mirror assembly comprising
(1) an outer reflecting member, formed with a truncated-conical bore having a truncated-conical inner reflecting surface whose mean radius is substantially the same as that of the cylinder of the laser medium and which is directed to the front end of the laser medium, for reflecting the laser beam emitted from the laser medium by the truncated-conical reflecting surface and focussing the laser beam on the central longitudinal axis of the laser medium, and
(2) an inner reflecting member, having conical outer reflecting surface whose means radius is smaller than that of said outer reflecting member, and being disposed in the bore of said outer reflecting member in such a manner that the reflecting surface of said inner reflecting member is directed to said output mirror through the bore of said outer reflecting member, for reflecting the laser beam impinged from said outer reflecting member toward said output mirror along the central longitudinal axis of the laser medium by the conical reflecting surface so that the laser beam focussed by the outer reflecting member is defocussed to be a parallel pencil of rays having a substantially full beam cross-section.

23. The laser device of claim 22, in which the base material for said laser medium comprises a transparent glass.

24. The laser device of claim 22, in which the base material for said laser medium comprises a transparent crystal.

25. The laser device of claim 22, in which the surface finish of the outer surface of said hollow cylinder is one of a mechanically ground finish, sand blasted finish, and chemically etched finish.

* * * * *